July 26, 1960

F. KUHRT 2,946,955

MEASURING APPARATUS COMPRISING A MAGNETIC
FIELD-RESPONSIVE RESISTOR AS A
CONDITION-RESPONSIVE ELEMENT

Filed Aug. 25, 1954

United States Patent Office 2,946,955

Patented July 26, 1960

2,946,955

MEASURING APPARATUS COMPRISING A MAGNETIC FIELD-RESPONSIVE RESISTOR AS A CONDITION-RESPONSIVE ELEMENT

Friedrich Kuhrt, Nurnberg, Germany, assignor to Siemens-Schuckertwerke Aktiengesellschaft, Berlin-Siemensstadt, Germany, a German corporation Filed Aug. 25, 1954, Ser. No. 452,023

Claims priority, application Germany Aug. 31, 1953

17 Claims. (Cl. 324—101)

My invention relates to current-responsive electric apparatus and, more particularly, to current-responsive apparatus whose sensing element consists of an electrical conductive member and electric property of which varies when under the influence of the magnetic field surrounding a currrent-carrying conductor.

It is known that bismuth changes its electrical resistance when exposed to a magnetic field, and this characteristic has been utilized for measuring the strength of magnetic fields. However, the sensitivity of such a device is poor because the resistance change of bismuth is only slight. It is a principal object of my invention, therefore, to provide current-measuring or current-responsive devices utilizing generally the above-mentioned principle that are far more sensitive than has heretofore been attainable.

Another object of my invention is to make magnetically responsive apparatus of the type described above suitable for use as current-responsive regulators, for example, for regulating the load current in the output circuit of an amplifier.

Still another object of the invention is to provide a direct-current transforming device of simpler design than heretofore available.

To achieve these objects, and in accordance with my invention, I place close to the conductor in which current is to be measured an electric circuit member consisting essentially of a crystalline semiconductor compound of a carrier mobility of about 6000 cm.²/volt second or more, so that the magnetic field caused by the flow of current is effective in the semiconductor to change an electric property thereof; and I apply this change either as a measure of the current, or as an error signal for effecting a control or regulatory operation. The electric property of the semiconductor compound thus utilized may be its resistance. However, the Hall effect voltage of the semiconductor may also serve as the current-responsive control function.

The measuring device according to the present invention has an important application as a substitute for the known "direct-current transformer" operated on the basis of saturable reactors that are controllable by pre-magnetization. Compared therewith, however, a measuring device according to my invention is considerably simpler not only in design but also with respect to application and operation.

These and other objects, advantages and features of the invention will be apparent from the following description taken in conjunction with the embodiments of the invention shown in the accompanying drawings, wherein.

Figure 1:
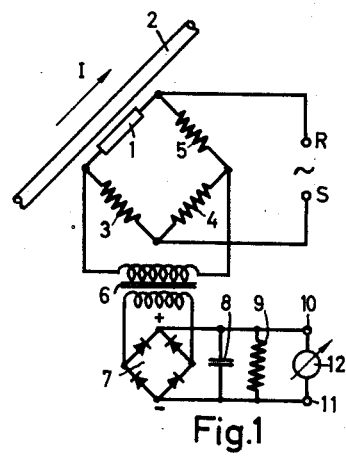
Fig. 1 is an alternating-current bridge circuit for measuring current in a conductor as a function of change in resistance in an adjacent semiconductor and utilizing a voltage step-up transformer and a full wave rectifier in the indicating circuit.

The invention is predicated upon the correlation existing between the carrier mobility of a semiconductor and the change in its electric properties due to the effect of a magnetic field. "Carrier mobility" is defined as the velocity of the electric charge carriers within the semiconductive substance in centimeters per second in an electric field of one volt per centimeter. The same semiconductive substance may exhibit (n-type) conductance by excess electrons or negative carriers, or it may exhibit (p-type) conductance by defect-electrons (holes) or positive carriers, depending upon the preparative treatment applied to the substance. The type of conductance depends particularly on the choice of small traces of substitutional impurities that are added to, or contained in, the substance and cause lattice defects, i.e. disturb the perfection of the valence-bond structure. The term "carrier mobility" or "mobility" as used herein is generic to both types of conductance, it being only essential that either the electron mobility or the hole mobility of the semiconductive compound be about 600 cm.²/volt second, or more.

The change in electric properties utilized for the purposes of the invention may consist in the resistance variation to which a semiconductor is subjected when in a varying magnetic field surrounding a conductor carrying a varying current. However, as shown below, the Hall-effect voltage occurring in a semiconductor when in a varying magnetic field surrounding the conductor may also be utilized instead of, or in addition to, the change in resistance.

Comprehensive research has shown that the high carrier mobility required for the substances to be used according to the present invention can be expected only from semiconductive compounds. In this connection it should be noted that germanium has a carrier mobility of about 3000 cm.²/volt second and that this value has heretofore been considered to be the uppermost limit of the carrier mobility in semiconductors. In contrast thereto, it has been found that carrier mobilities can be obtained with semiconductive compounds that go beyond the mobility of germanium and attain values of 6000 cm.²/volt second and more. Although the known use of bismuth as a measuring body of magnetically-responsive resistance properties in devices of the type here concerned was not predicated upon the carrier mobility of bismuth, it may be mentioned that bismuth possesses a carrier mobility of 5000 cm.²/volt second. It is, therefore, apparent that when using semiconductive compounds with a carrier mobility of 6000 cm.²/volt second, an increase in the change of the utilized electric property within the magnetic field and, hence, an increase in measuring accuracy, is achieved even in comparison with bismuth.

On the basis of the research results, the increase in carrier mobility in semiconductor compounds can be explained as follows:

A compound, in contrast to a homopolar element, has, aside from its homopolar component, also a heteropolar component due to the chemical difference in the lattice elements (in alkali halogenide crystals the homopolar component is even practically zero and only the ionized heteropolar component is present). The superposition of homopolar and heteropolar components results in an increase in bonding energy due to the so-called resonance strengthening. This has a favorable effect upon the carrier mobility in all those cases in which the heteropolar component of a compound is so weak that its detrimental influence upon the electron mobility is not yet noticeable while at the same time the strengthening of the bond by the resonance between the homopolar and heteropolar components is appreciable.

The foregoing applies especially to semiconducting compounds of an element of the third group ($A_{III}$) of the periodic system with an element of the fifth group ($B_V$). Among these binary compounds of the type $A_{III}B_V$ there are substances having carrier mobilities higher than 6000 cm.$^2$/volt second. Compounds of the type $A_{III}B_V$ even include substances that possess a considerably higher carrier mobility, namely mobilities of about 10,000 cm.$^2$/volt second or even 20,000 cm.$^2$/volt second and more. For instance, indium antimonide (InSb), belonging to the group of the semiconductive compounds of the type $A_{III}B_V$, exhibits an electron mobility of about 25,000 cm.$^2$/volt second. This compound is especially well suitable for the purpose of the present invention. Another semiconductive compound of the type $A_{III}B_V$ particularly suitable for the invention is indium arsenide (InAs).

Various methods are available for the production of the compounds $A_{III}B_V$. For instance, the compounds may be melted together (applicable with AlSb, GaSb, InSb), or the compounds may be obtained, for instance, by reducing the oxide of the trivalent element with the aid of a stream of hydrogen loaded with the vapor of the pentavalent element (applicable with GaAs, InAs).

It is clear from the foregoing that the variation in the utilized property of the measuring body becomes larger with an increased carrier mobility of the measuring body. It is preferable, therefore, to make the measuring body of semi-conductive compounds whose carrier mobility exceeds 6000 cm.$^2$/volt second, or for instance, the value of 10,000 or even the value of 20,000 cm.$^2$/volt second or more.

In using bismuth as the measuring body it was, as a rule, given the shape of a wire spiral. In the present invention, wherein a semiconductive compound is used as the measuring body, it is preferably manufactured as a small rod having a cross-sectional area of a few square millimeters. The main reason therefor, among others, is that the applicable semiconductors consist of crystals.

In Fig. 1, a magnetic field-responsive resistor consisting of a semiconducting $A_{III}B_V$ compound is denoted by the numeral 1. This resistor is located in the immediate vicinity of an independent current-carrying conductor 2. The conductor 2 may be a direct-current supply bus of an electrolytic plant or the like. The resistor 1 is joined with three other noninductive resistors 3 to 5 to form a bridge circuit energized between its terminals R and S by a source of alternating current. The primary winding of a transformer 6 is connected in the measuring diagonal of the bridge. The secondary winding of transformer 6 is connected through a rectifier bridge 7 to the output terminals 10 and 11, across which a direct-current measuring instrument 12, such as a galvanometer, is connected. A capacitor 8 and a resistor 9 are connected in parallel with the output terminals 10 and 11. The bridge circuit comprising the resistors 1, 3, 4 and 5 is balanced when the conductor 2 is not carrying current. When current flows through the conductor 2, the resulting magnetic field surrounding the conductor causes the resistor 1 to change its resistance. As a result, the bridge becomes unbalanced and a voltage appears across the measuring diagonal. This voltage is stepped-up in the transformer 6, and then rectified, and thus made available as unidirectional voltage across the terminals 10 and 11. This voltage is proportional to the direct current I flowing in the conductor 2. The magnetically-responsive resistor 1 consists preferably of one of the above-mentioned $A_{III}B_V$ semiconductor compounds and has preferably the shape of a long thin strip closely placed along the conductor 2.

Figure 2:
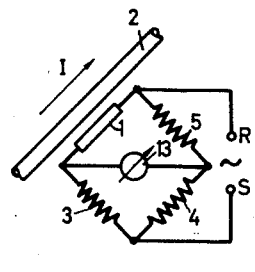
Fig. 2 is an alternating-current measuring bridge circuit similar to Fig. 1 but without the transformer and rectifier.

Instead of using a direct-current measuring instrument, an alternating-current instrument 13 can be used and connected directly into the measuring diagonal of the alternating-current bridge as shown in Fig. 2.

Figure 3:
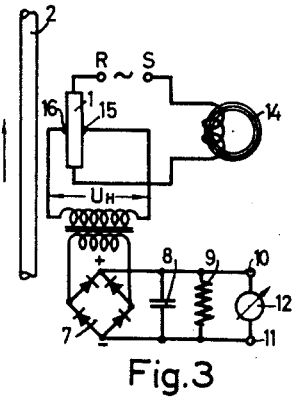
Fig. 3 is an alternating-current circuit comprising a semiconductor for measuring current strength in an independent current-carrying conductor as a function of change in Hall-effect voltage in the semiconductor.

While the devices according to Figs. 1 and 2 are predicated upon the change in ohmic resistance of the magnetically-responsive resistor 1, the embodiment according to Fig. 3 utilizes the Hall effect. In Fig. 3, the field-responsive resistor 1 is shown to be connected not in a bridge circuit, but in a simple alternating-current circuit. The resistor 1 is connected in series with a reactor coil 14, preferably of the toroidal type. The core of the reactor 14 consists of a wound magnetic strip of a ferromagnetic material of high permeability having a substantially rectangular magnetization characteristic. The core may consist, for instance, of one of the high-permeability materials known by the trade names Permeron, Ortholol, or δ-max. Due to its substantially rectangular magnetization characteristic, the wound-core reactor 14 permits only a certain magnetizing current to pass through, this current being independent of line-voltage fluctuations and determined only by the width of the hysteresis loop. Consequently, the current flowing through the resistor 1 has a practically rectangular wave shape of constant amplitude. When the conductor 2 in the immediate vicinity of the resistor 1 is traversed by current, the current produces a strong magnetic field in the resistor 1. Contrary to Fig. 1, however, the Hall voltage $U_H$ occurring between two electrode points 15 and 16 of the resistor is picked up and utilized for the desired measuring operation. The Hall voltage is proportional to the product of the magnetic field strength produced by the current I and the current flowing through the resistor 1. Since the latter current is constant, as explained above, the Hall voltage between the electrode points 15 and 16 is proportional only to the magnetic field of the conductor 2 and hence to the current I flowing through the conductor. The Hall voltage is stepped up by means of the transformer 6 and, as in the embodiment of Fig. 1, passed through a full-wave rectifier 7 to the terminals 10 and 11 of a direct-current instrument 12. A stabilizing circuit comprising the capacitor 8 and the resistor 9 is connected across the output terminals 10 and 11.

Figure 4:
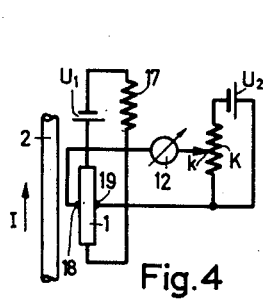
Fig. 4 is a simplified circuit including a compensating network for measuring current strength in an independent current-carrying conductor as a function of change in Hall-effect voltage in the semiconductor.

Fig. 4 illustrates a modification of the invention wherein the Hall voltage is utilized in a direct-current circuit including a calibrating network. According to Fig. 4, the semiconductor is connected in series with a resistor 17 across a source of direct current $U_1$ of constant predetermined voltage. A calibrating resistor K is connected across a direct current source $U_2$, also of predetermined constant voltage. Resistor K has a slidable contact $k$. Mounted on the semiconductor 1 at 18 and 19 are two Hall electrode contact points located on an equipotential surface when the semiconductor is located outside a magnetic field. The contact point 18 is electrically connected with the tap contact $k$ through the null instrument 12 and the contact point 19 is connected to one end of the calibrating resistor K.

The device according to Fig. 4 is used as follows. Before current is passed through the conductor 2, the slide tap contact k is adjusted so that the measuring instrument 12 indicates zero. Then the current to be measured is passed through the conductor 2. The semiconductor strip 1 is subjected to the magnetic field produced in consequence of that current. According to the so-called Hall effect, this results in a rotation of the equipotential surface of the semiconductor 1 so that a voltage occurs between points 18 and 19. This voltage is a function of the magnitude of the current flowing through the conductor 2 and the magnetic field thereby produced, and is calibrated and measured by correspondingly displacing the slidable tap contact k of the calibrating resistor K.

For accurate measurement of current by the method described with reference to the device illustrated in Fig. 4, it is required that the Hall voltage be of comparatively large magnitude. This in turn is dependent upon the carrier mobility of the substance used for the semiconductor member. Consequently, in this case, the increase in carrier mobility has the effect of correspondingly increasing the Hall voltage, thereby again resulting in a corresponding increase in measuring accuracy.

Figures 5, 6:
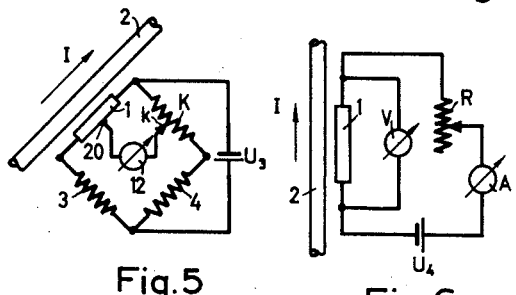
Fig. 5 is an alternating current bridge circuit for measuring current strength in an independent current-carrying conductor as a function of both change in resistance and change in Hall-effect voltage in the semiconductor.
Fig. 6 shows a simplified circuit for measuring current strength in an independent current-carrying conductor as a function of change of resistance in the semiconductor.

As hereinabove mentioned, the measuring methods described with reference to Figs. 1 and 4 can be combined so as to utilize the sum of the Hall voltage and the voltage corresponding to the resistance change of the semiconductor body in the current-induced magnetic field. An embodiment of a device based on this combined method is shown in Fig. 5. According to Fig. 5, the semiconductor member 1 is connected in series with the resistor 3 across a source of direct-current voltage U and in parallel relation therewith is connected a calibrating resistor K and a resistor 4. The calibrating resistor K has a slidable tap contact k. The semiconductor 1 has a Hall electrode contact point 20 electrically connected with the slidable tap contact k through a null indicating instrument 12. In this embodiment, the semiconductor member 1 need be equipped with only a single electrode contact point.

The measuring operation is performed similarly as described in connection with the embodiment illustrated in Fig. 4. That is, prior to subjecting the semiconductor element 1 to the magnetic field induced by the current in conductor 2, the slidable contact k is so adjusted that the instrument 12 indicates zero. Thereafter, the semiconductor member 1 is subjected to the magnetic field of a current flowing in conductor 2 and the tap contact k is again displaced until the instrument 12 returns to zero. The required displacement of the tap contact k is indicative of the voltage difference occurring at the point 20 due to the effect of the current being measured. This voltage change at contact point 20 will be recognized as being due to the Hall voltage and also to the change in resistance caused in the semiconductor element 1 by the magnetic field surrounding the current-carrying conductor 2 as a result of the current I flowing therethrough. By correspondingly calibrating the compensating resistor K, the current I to be measured can be read off directly. With a device according to Fig. 5, both electrical magnitudes on which the measuring operation is predicated, viz. both the Hall voltage occurring across the semiconductor element 1 and the change in electrical resistance thereof, are dependent upon the carrier mobility of the substance of which the semiconductor is formed. Consequently, the device, according to Fig. 5, has the advantage that the magnitude of the carrier mobility enters twice, additively, into the measuring performance.

The above-described methods can be embodied in many other circuits that, for some purposes, can be simplified, for instance as illustrated in Fig. 6. In Fig. 6, a semiconductor sensing member 1 is connected in an energization circuit comprising a direct-current voltage source $U_4$, an ammeter A and a calibrating resistor R in series. The semiconductor member 1 is subjected to the magnetic field produced by the current I flowing through current-carrying conductor 2. A voltage-measuring instrument V is connected across the two main electrodes of the semiconductor sensing element 1. The voltage-measuring instrument V measures the voltage drop across the semiconductor element 1 and, therefore, also indicates changes in resistance therein caused by the effect of the magnetic field surrounding the current-carrying conductor 2.

Due to the fact that a magnetically-responsive semiconductor sensing member according to the invention provides electric variations of a relatively large magnitude, such devices are well suited for control and regulatory purposes and offer the advantage that they can readily be combined with amplifiers, such as magnetic amplifiers, that require a relatively large input energy as compared with electronic tube amplifiers having high-ohmic input circuits of negligible energy requirements. However, also when used with electronic or relay amplifiers, a device according to the invention is advantageous because it then permits reducing the number of amplifying stages. An example of the use of the semiconductor device described herein for regulating the load current in the output circuit of a magnetic amplifier is illustrated in Fig. 7.

Figure 7:
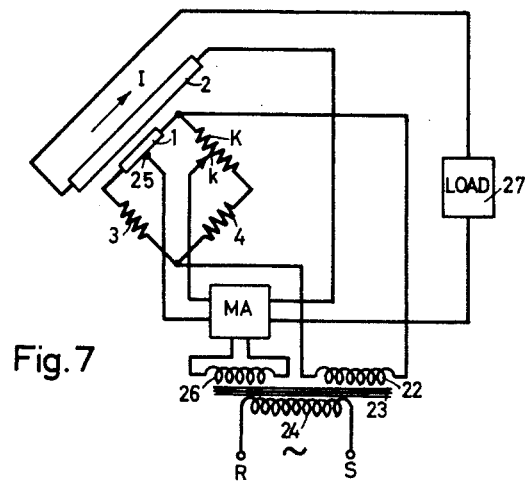
Fig. 7 illustrates an alternating-current bridge circuit including a magnetic amplifier for regulating current in the load circuit of the amplifier by an error signal derived from the current being regulated.

In Fig. 7 there is shown a bridge circuit comprising the resistors 3, 4, K and the semiconductor 1. This bridge circuit is similar to that described in connection with the embodiment illustrated in Fig. 5, but is energized by alternating current from a secondary winding 22 of a transformer 23. The input terminals R and S of the primary transformer winding 24 are energized by a source of alternating current. The unbalance measuring output circuit of the bridge, taken between the electrode point connected to the semiconductor element 1 at 25 and the movable tap k on the resistor K is connected to the input of a magnetic amplifier MA. The magnetic amplifier is energized, preferably, from a second secondary winding 26 of the transformer 23. The output circuit of the magnetic amplifier MA is connected to a load 27 by current buses, a portion of one of which, as indicated by the numeral 2, lies closely parallel with the semi-conductor element 1. Thus, as described above in connection with other embodiments of the invention, when a current I flows in the conductor 2, this being the current flowing through the load 27, a proportional voltage will be developed in the output circuit of the bridge, and this output is so connected in the input circuit of the magnetic amplifier MA as to counteract current variation in the load circuit. By control of the variable contact K, the load current I can be stabilized or regulated at any desired value.

Advantageous fields of application for measuring devices according to the invention are, for instance, in large industrial electroplating and electrolysis plants. The measuring devices according to the invention may further be used for the control of relays or contactors for current limitation, particularly for the prevention of excessive consumption by limitative-rate customers, and for protective purposes such as voltage protection of machines including the starting of large direct-current machines. Devices according to the invention are also applicable to advantage as condition-responsive devices for regulating purposes, as exemplified by the embodiment illustrated in Fig. 7.

It will be understood by those skilled in the art that the invention permits of various embodiments, modifications and uses other than those herein specifically described, without departing from the essential features of the invention as set forth in the claims annexed hereto.

I claim:

1. Apparatus for measuring electrical current, comprising a conductor traversed by the current to be measured, an electric circuit member consisting of a semiconductor compound having a minimum carrier mobility of about 6000 cm.$^2$/volt second, said member being insulated from said conductor and disposed in close parallel relation thereto and at a fixed distance therefrom, a current source connected with said member to pass another current through said member independently of current to be measured, and electric measuring means connected to said member and responsive to an electrical property of said member dependent upon the field of said conductor.

2. Apparatus for measuring electrical current, comprising an elongated substantially non-inductive current conductor for carrying the current to be measured, a circuit member comprising an elongated resistor body of a binary semiconducting compound of respective elements from the third and fifth periodic groups respectively and having minimum carrier mobility of about 6000 cm.$^2$/volt second, said member being in closely spaced insulated parallel fixed relationship with respect to said conductor, means including a current source connected with said member to pass a current of substantially constant average magnitude through said member, and measuring means connected with said member and responsive to an electrical property of said member dependent upon the field of said conductor.

3. Apparatus for measuring electrical current, comprising an elongated current conductor for carrying the current to be measured, a circuit member comprising an elongated body of semiconductor compound having a minimum carrier mobility of about 6000 cm.$^2$/volt second, said member being in closely spaced parallel insulated relationship with respect to and at a fixed distance from said conductor, measuring means responsive to a change in the electrical properties of the member due to a change in current flowing through said conductor, said measuring means comprising a balanceable network having a measuring branch and a condition-responsive branch, and a device responsive to an electric magnitude connected in said measuring branch, said member being connected in said condition-responsive branch.

4. Apparatus according to claim 1 wherein said member comprises indium antimonide (InSb).

5. Apparatus according to claim 1 wherein said member comprises indium arsenide (InAs).

6. Apparatus for measuring electrical current, comprising an elongated current conductor for carrying the current to be measured, a circuit member comprising an elongated body of semiconductor compound having a minimum carrier mobility of about 6000 cm.$^2$/volt second and having two main electrodes and an intermediate Hall electrode, said body extending along said conductor in insulated relation thereto and at a fixed distance therefrom, an electric circuit comprising voltage supply means connected across said two main electrodes, and electric condition-responsive circuit means connected between said Hall electrode and one of said main electrodes and responsive jointly to the Hall-effect voltage and the resistance change caused in said member by the magnetic field surrounding said conductor as a result of current flowing through said conductor.

7. Apparatus for regulating current in the load circuit of a power amplifier, comprising a power amplifier having an input circuit and an output circuit, an electrical load in said output circuit, said output circuit comprising an elongated load-current conductor, a circuit member comprising an elongated resistance body of semiconductor compound having a minimum carrier mobility of about 6000 cm.$^2$/volt second, said member being in closely spaced fixed parallel relationship to said load-current conductor, circuit means responsive to change in the electrical properties of said member due to change in current flowing through said current conductor, said circuit means having output leads connected in said input circuit of said amplifier so as to oppose change of current in said current conductor and through said load.

8. Apparatus for measuring electrical current, comprising an elongated current conductor for carrying the current to be measured, a circuit member comprising an elongated body of semiconductor compound, said compound being a binary semiconducting compound of an element of the third periodic group with an element of the fifth periodic group and having a carrier mobility of at least about 6000 cm.$^2$/volt second, said member when in operation being in fixed closely spaced parallel insulated relationship with respect to said conductor, measuring means responsive to a change in the electrical properties of the member due to a change in current flowing through said conductor, said measuring means comprising a balanceable network having a measuring branch and a condition-responsive branch, and a device responsive to an electric magnitude connected to said measuring branch, said circuit member being connected in said condition-responsive branch.

9. Apparatus for sensing electrical current without interposing a pre-amplifier with a high-ohmic input circuit, comprising an elongated current conductor for carrying the current to be measured, a circuit member comprising an elongated resistor body of a binary semiconducting compound of respective elements from the third and fifth periodic groups respectively and having a carrier mobility of at least about 20,000 cm.$^2$/volt second, said member when in operation being in closely spaced insulated parallel relationship with respect to and at a fixed distance from said conductor, means including a current source connected with said member to pass a current of substantially constant average magnitude through said member, and sensing means connected with said member and responsive to an electrical property of said member dependent upon the field of said conductor.

10. A system responsive to variation in direct current, comprising a substantially straight non-inductive direct current bus, an elongated crystalline semiconductor rod fixedly disposed with its long dimension in substantial parallelism with the bus, but not in electrical contact therewith, the rod being composed of a semiconductor compound having a carrier mobility of at least 6,000 cm.$^2$/volt second taken from the group consisting of InAs and InSb, electric current supply terminals connected to the member at points mutually spaced lengthwise thereof, current supply means connected to said terminals for supplying a current of constant average magnitude thereto, electric circuit means responsive to a change in the electrical properties of the member due to a change in current flowing in the bus, said member being connected in said circuit means.

11. A system responsive to variation in direct current, comprising a substantially straight non-inductive direct current bus, an elongated crystalline semiconductor rod fixedly disposed with its long dimension in substantial parallelism with the bus, but not in electrical contact therewith, the rod being composed of a semiconductor compound having a carrier mobility of at least 6,000 cm.$^2$/volt second taken from the group consisting of InAs and InSb, electric current supply terminals connected to the member at points mutually spaced lengthwise thereof, current supply means connected to said terminals for supplying a current of constant average magnitude thereto, electric circuit means responsive to a change in resistance of the member due to a change in current flowing in the bus, said member being connected in said circuit means as a resistive element thereof.

12. A system responsive to variation in direct current, comprising a substantially straight non-inductive direct current bus, an elongated crystalline semiconductor rod fixedly disposed with its long dimension in substantial parallelism with the bus, but not in electrical contact therewith, the rod being composed of a semiconductor compound having a carrier mobility of at least 6,000 cm.$^2$/volt second taken from the group consisting of InAs and InSb, electric current supply terminals connected to the member at points mutually spaced lengthwise thereof, current supply means connected to said terminals for supplying a current of constant average magnitude thereto, a Hall voltage electrode on said member spaced from said supply terminals, electric circuit means responsive to Hall voltage of the member due to a change in current flowing in the bus, said member and said Hall voltage electrode being connected in said circuit means.

13. The apparatus of claim 12, the compound being InAs, having a carrier mobility of at least 10,000.

14. The apparatus of claim 12, the compound being InSb, having a carrier mobility of at least 10,000.

15. Apparatus for measuring electrical current, comprising an elongated substantially non-inductive current conductor for carrying the current to be measured, a circuit member comprising an elongated resistor body of a binary semiconducting compound of respective elements from the third and fifth periodic groups respectively and having minimum carrier mobility of about 6,000 cm.$^2$/volt second, said member being in closely spaced insulated, parallel, relationship with respect to and at a fixed distance from said conductor, means including a current source connected with said member to pass a current of substantially constant magnitude lengthwise through said member, a Hall voltage electrode on said member, and measuring means connected with said member and said Hall electrode and responsive to the Hall voltage of said member dependent upon the field of said conductor.

16. The apparatus defined in claim 15, the compound being taken from the group consisting of InAs and InSb.

17. Apparatus for measuring electrical current, comprising a straight, substantially non-inductive conductor traversed by the current to be measured, an electric circuit member consisting of a semiconductor compound having a minimum carrier mobility of about 6,000 cm.$^2$/volt second, said member being insulated from said conductor and disposed in close parallel relation thereto and at a fixed distance therefrom, a current source connected with said member to pass another current through said member independently of current to be measured, and electric measuring means connected to said member and responsive to an electrical property of said member dependent upon the field of said conductor.

References Cited in the file of this patent

UNITED STATES PATENTS

| | | |
|---|---|---|
| 1,947,484 | Miller | Feb. 20, 1934 |
| 1,998,952 | Edgar et al. | Apr. 23, 1935 |
| 2,260,589 | Smith | Oct. 28, 1941 |
| 2,543,640 | Millar et al. | Feb. 27, 1951 |
| 2,550,492 | Millar | Apr. 24, 1951 |
| 2,551,265 | Hansen | May 1, 1951 |
| 2,562,120 | Pearson | July 24, 1951 |
| 2,616,074 | McCreary | Oct. 28, 1952 |
| 2,736,822 | Dunlap | Feb. 28, 1956 |
| 2,739,282 | Evans | Mar. 20, 1956 |
| 2,798,989 | Welker | July 9, 1957 |

OTHER REFERENCES

Publication I, "Zeitshrift Naturforschung" (German) vol. 7a, pages 744–749, 1952.

Publication II, Electronics, March 1954, pages 238, 240 and 242.